Figure 1:
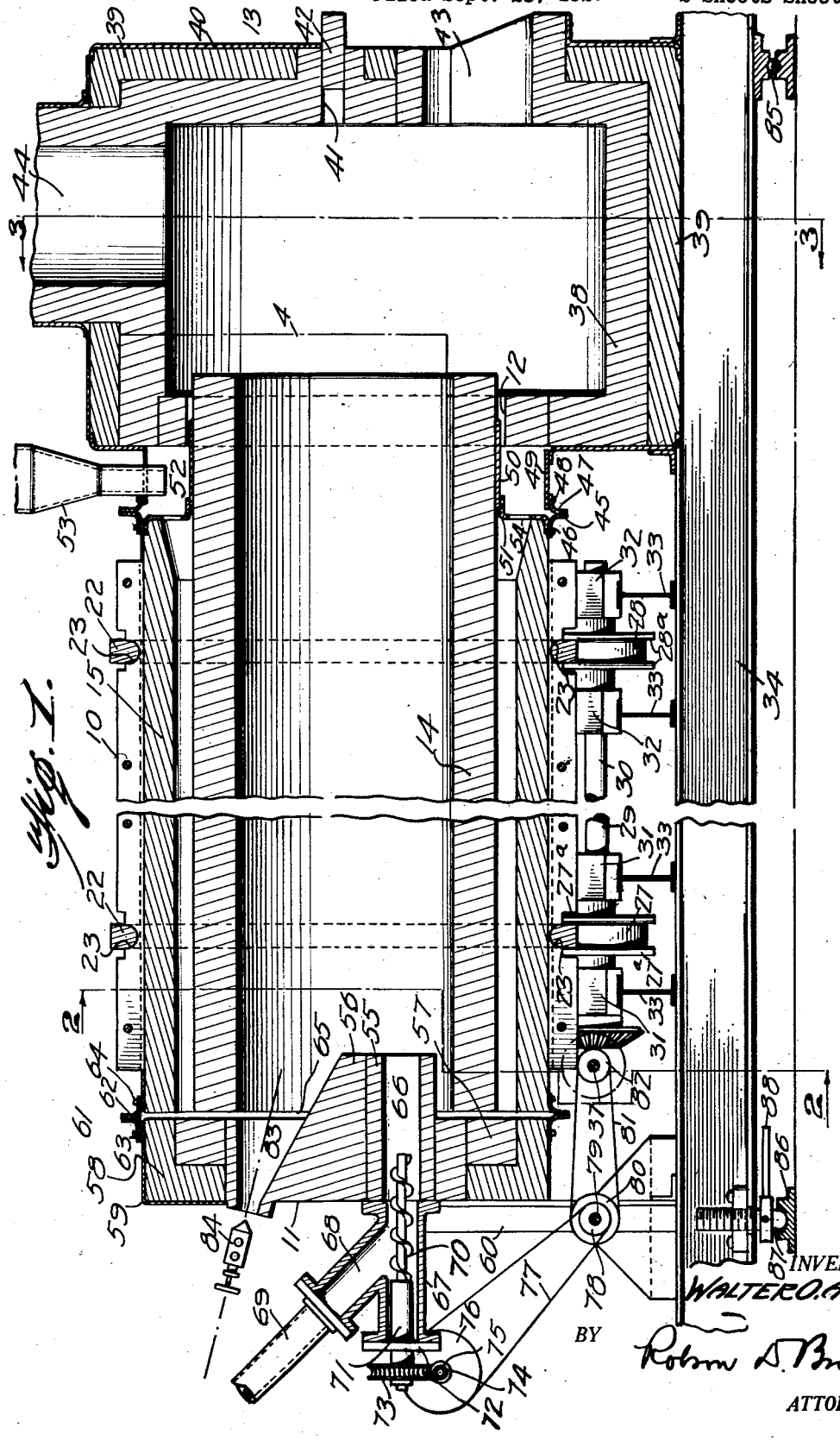

Nov. 29, 1932.   W. O. AMSLER   1,889,509
ROTARY TANK
Filed Sept. 28, 1927   2 Sheets-Sheet 1

Nov. 29, 1932.  W. O. AMSLER  1,889,509
ROTARY TANK
Filed Sept. 28, 1927  2 Sheets-Sheet 2

INVENTOR.
WALTER O. AMSLER,
BY
ATTORNEY.

Patented Nov. 29, 1932

1,889,509

UNITED STATES PATENT OFFICE

WALTER O. AMSLER, OF TOLEDO, OHIO, ASSIGNOR TO HARTFORD-EMPIRE COMPANY, OF HARTFORD, CONNECTICUT, A CORPORATION OF DELAWARE

ROTARY TANK

Application filed September 23, 1927. Serial No. 222,528.

My invention relates to the melting of glass batch and the preparation of the molten glass for subsequent fabrication into articles of glassware.

In the manufacture of glass, large stationary tanks of the so-called "continuous" type have been and are extensively used. Such tanks ordinarily hold as much as 60 to 100 tons of glass which is disposed therein in a relatively deep bath of 36 to 48 inches in depth. These tanks usually are substantially rectangular in plan and are covered by an arched roof of a suitable refractory material.

A stationary "continuous" tank of the type just mentioned is divided internally into a melting compartment and a refining compartment by a bridge wall which has a throat located below the glass level and which terminates below the roof of the tank so that the upper portions of the compartments of the tank are in open communication with each other. Glass making batch is dumped at intervals into the melting compartment of the tank and floats as an island upon the melted glass already therein while it is melted by a flame which is directed onto the surface of the glass from an oil or gas burner. The entire space within the tank thus must be heated to a relatively high temperature in order that the glass may be brought to a suitable high temperature since the heat is applied only to the surface of the glass. Because of the relatively great depth of glass in the tank and the comparatively low heat conductivity of such glass, considerable time is necessary for the heat that is applied to the surface of the glass to penetrate through the glass to and through the lower strata of glass in the tank. Moreover, the side walls and the bottom of the tank of the character described are relatively cold and it therefore is difficult, if in fact not practically impossible, to heat the glass uniformly throughout any cross-section of the tank and to dependably maintain such uniform temperature condition throughout the cross-section of the tank. As a result, channels or strata of different temperatures and conditions form in the glass in the tank and interfere with the production of homogeneous glass of uniform temperature and condition for subsequent fabrication into articles of glassware.

It has been proposed prior to the present invention to melt glass making batch fed at intervals to the interior of a heated melting drum which is rotated slowly about its longitudinal axis with a view to securing an effective melting action on the glass with a relative low degree of heat and an effective mixing of the glass in the drum. In the use of such apparatus, it has heretofore been necessary to stop the rotation of the drum at intervals to permit the introduction of fresh glass making batch thereto and for the removal of glass through working-out openings in the periphery of the drum and consequently such apparatus does not provide desirable continuity of glass making operations.

It also has been proposed by me prior to the present invention to conduct molten glass from a stationary melting compartment through a rotating mixing and refining compartment to a glass forming means, with a view to eliminating striæ in the glass, as disclosed in U. S. Patent 1,577,602, granted to the present applicant on March 23, 1926.

The present invention seeks to obviate the objectionable features of the large stationary "continuous" furnace tanks while still maintaining desirable continuity of glass making operations.

An object of the present invention therefore is to provide a method of and apparatus for continuously making glass of uniform and homogeneous condition and temperature rapidly and by means of a comparatively small furnace structure.

This object may be attained by feeding a continuous stream of glass batch into one end of a continuously rotating melting compartment, spreading the batch in a thin layer on the interior wall at one end of the compartment, heating the interior of the rotating compartment and the batch fed thereinto sufficient to cause vitrifaction of the batch as the melting compartment rotates, the continuous rotation of the melting compartment serving to continuously roll, knead and mix the contents thereof and to subject the same to heat from all points about the axis of rotation of the compartment, thus assuring an effective melting and mixing action on the contents of the rotating compartment without waste of heat and without the formation of channels or strata in the molten glass, such as are incident to the use of a large stationary furnace tank. The continuous substantial clearing of the glass as melted from the receiving end of the rotating compartment is desirable to permit the newly fed batch to spread out in a thin layer on the wall of the compartment, and this end may be accomplished by suitable regulation of the relative rate of flow of the melted glass and of the feed of the batch. The rotating compartment contemplated by the present invention may be supported so that its axis of rotation is inclined downwardly slightly from the glass batch receiving end thereof toward its opposite end where a glass receiving compartment or working-out receptacle is provided for the reception of a continuous discharge of molten glass from the rotating melting and mixing compartment. The inclination of the axis of rotation of the melting compartment from its glass batch receiving end toward the working-out chamber may be varied to vary the rate of movement of the molten mixture longitudinally of the rotating compartment. If the axis of the rotary compartment is inclined from the horizontal, the rate of feeding of the continuous stream of batch into the compartment, longitudinal movement of the melted glass, and the inclination of the axis of rotation of the melting and mixing compartment from the horizontal are so related that a pre-heated portion of the inner wall of the rotating compartment is always cleared sufficiently to receive the oncoming portion of the continuous stream of batch and the melting, mixing and refining of the glass mixture thus take place with a continuity which has heretofore not been attainable in the use of glass making apparatus having a rotating drum or compartment.

A further object of the invention is the provision of glass making apparatus having a rotating glass melting and refining compartment constructed to permit regulated cooling of the portions of the walls thereof which are not in actual contact with the molten glass without interfering with the uniform and proper heating of the glass contacting inner surface of such walls, thus tending to prolong the life of the improved apparatus when the walls thereof are made of suitable materials without tending to cause the formation of "channels" or strata of glass of different temperatures and conditions in the glass melting and refining compartment of the apparatus. To this end, the rotary portion of the apparatus preferably is made of an inner lining or layer of refractory blocks or material that is highly resistant to the corrosive action of molten glass. This inner lining is formed with longitudinal channels in its outer surface next to a layer of heat insulating material. The insulating layer is confined about the refractory inner layer by a removable sectional metallic casing or shell. The longitudinal passages communicate with the interior of the rotary compartment at the batch receiving end thereof where the air having become heated in passing through the passages may aid in supporting combustion of the flame used to heat the compartment. A burner is arranged to discharge into the rotary compartment at the glass batch receiving end of the latter. A stack is provided in communication with the discharge end of the rotary compartment for the escape of the heated gases and a fan for forcing air through the passages in the wall of the rotary member for cooling the latter communicates with said passages at the end of the rotary member that is opposite to said burner. An effective glass melting and mixing action thus is obtained in the rotating compartment of the improved apparatus without undue heating of the walls thereof.

A still further object of the invention is a provision of a glass making apparatus having a rotary glass melting, mixing and refining compartment that is readily accessible for repairs when required.

Figure 2:
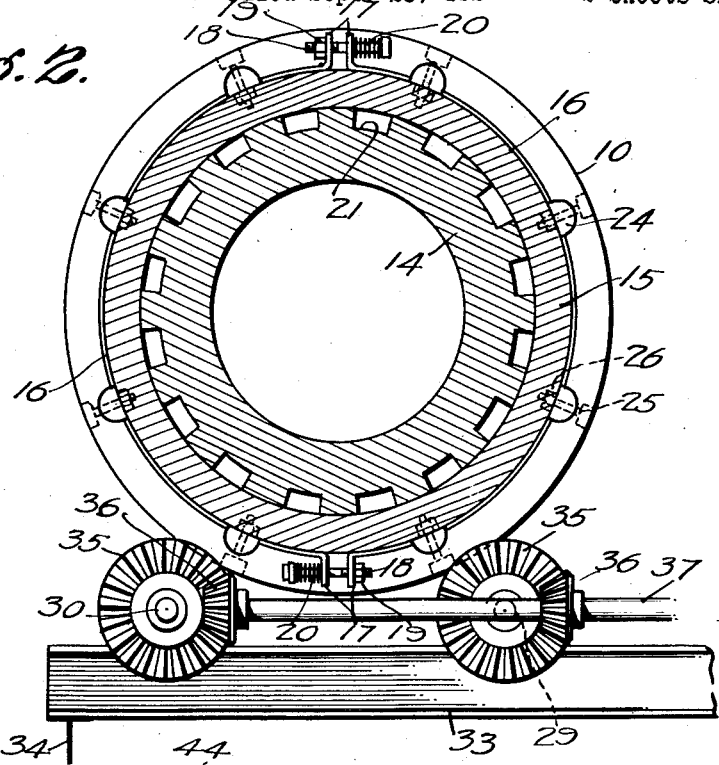
Figure 3:
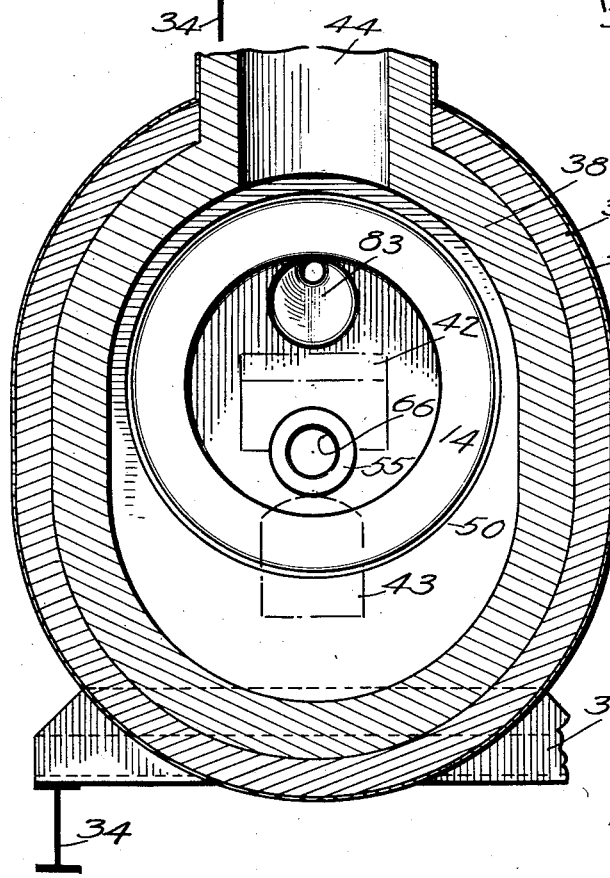

Other objects and advantages of the invention will be apparent from the following description, when considered in conjunction with the accompanying drawings, in which Fig. 1 is a longitudinal vertical section through an apparatus embodying mechanical features of the present invention and adapted for use in carrying out the novel method, Fig. 2 is a transverse vertical section substantially along the line 2—2 of Fig. 1 with the supporting platform structure of the apparatus only partially shown, and Fig. 3 is a transverse vertical sectional view similar to Fig. 2 but taken substantially along the line 3—3 of Fig. 1 and looking in the direction opposite to Fig. 2.

An apparatus embodying the invention as illustrated in the drawings comprises a rotary substantially cylindrical melting, mixing and refining body or compartment generally indicated at 10 which is suitably supported for rotation about an axis that extends longitudinally thereof and is inclined a slight adjustable degree from the horizontal. A stationary head structure 11 is located at one end of the rotary body 10. The other end of the rotary body 10 extends into an opening 12 in one side of a stationary hollow structure or receptacle 13 which is adapted to receive molten glass from the rotary body 10 and to hold such molten glass for removal as desired for fabrication into articles of glassware.

The rotary melting, mixing and refining body 10 preferably comprises an inner layer or a lining 14 made of a high grade refractory material that is highly resistant to the corrosive action of molten glass. The inner lining 14 is shown as being cast or formed in one piece but obviously it may be made up of individual brick or blocks.

The inner lining 14 of the rotary body 10 is covered by a layer 15 of refractory heat insulating material which is confined within an outer metallic casing. Such outer metallic casing preferably comprises two co-operative substantially semi-cylindrical sections 16 (see Fig. 2) having longitudinally extending outturned flanges 17 at their adjacent edges adjustably connected by suitable fastening devices, such as the bolts 18 which extend through aligned slots or apertures in the adjacent flanges 17 and carry the nuts 19 and the spring thrust members 20. The outer shell of the rotary body 10 thus can be quickly removed to permit inspection or repair of the inner parts of the rotary compartment and as quickly and conveniently replaced.

The refractory inner layer 14 of the rotary body 10 is formed with longitudinally extending grooves 21 in its outer wall next to the insulating layer 15, thus producing passages which extend the entire length of the rotary body between the refractory inner layer 14 and the insulating layer 15.

The rotary body 10 may be supported for rotation about its longitudinal axis by means of hoops or rings 22 which encircle the rotary body and are held against sliding movement axially of the rotary body 10 by engagement with seats 23 in the flanges 17 of the sections of the outer shell of the rotary body and by pairs of out-turned lugs 24 which are provided on the sections 16 of the shell in contact with the edges of the rings 22. The rings 22 are held against turning on the rotary body 10 by suitable fastening devices, such as the bolts 25 and the nuts 26, whereby the rings 22 are anchored securely to the shell and to the insulating layer 15 of the rotary body. The heads of the bolts 25 are countersunk in the peripheries of the rings 22 and the rim or peripheral surfaces of the rings 22 rest on the peripheries of driving wheels 27 and 28 between flanges 27a and 28a at the rim edges of the respective driving wheels. The wheels 27 and 28, respectively, are carried by horizontal shafts 29 and 30 which are journaled in suitable bearings, as at 31 and 32, respectively, on cross-beams 33 which are carried by a platform 34. The shafts 29 and 30 extend parallel with the axis of rotation of the rotary compartment 10 below and at opposite sides of the longitudinal axis of the rotary compartment 10 so that one of each pair of wheels 27—28 will contact with the rings 22 at one side of the vertical plane that extends longitudinally of the rotary compartment 10 at the center of the latter and the other of each pair of wheels 27—28 will contact with the rings 22 at the opposite side of said vertical plane.

The shafts 29 and 30 are driven in the same direction at the same speed by suitable drive mechanism which may comprise bevel gears 35 on the shafts 29 and 30 in mesh with bevel gears 36 on a drive shaft 37. The shaft 37 is suitably supported on the platform 34 and may be driven from any suitable source of power (not shown). It thus will be apparent that when the shaft 37 is rotated, the compartment likewise will be rotated slowly about its longitudinal axis.

The platform 34 supports the aforesaid glass receiving receptacle 13 so that an end portion of the inner layer 14 of the rotary compartment 10 projects through the opening 12 in the side wall in the adjacent side of the receptacle 13. The receptacle 13 may be formed of an inner layer 38 of suitable refractory material, a refractory heat insulating layer 39 surrounding the inner layer 38 and an outer metallic shell 40 which clamps the insulating layer 39 to the inner layer 38. A section of the walls of the receptacle 13 may be removable along the line 4 in Fig. 1 when desired to permit convenient removal and replacement of the adjacent end of the rotary compartment 10. The receptacle 13 is formed with a peep opening 41 opposite the adjacent end of the rotary compartment 10. This peep opening normally is closed by a removable refractory plug 42. The receptacle 13 is also provided with a work-out or feeder opening 43. The upper part of the receptacle 13 communicates with a passage 44 which may lead to a chimney, stack, or recuperator (not shown) and provides for the escape of heated products of combustion from the rotary compartment 10.

The insulating layer 15 terminates a slight distance from the adjacent side of the receptacle 13. A spring sealing ring 45 is secured to the rotary compartment 10 at the end of the insulating layer 15 next to the receptacle 13 by bolts 46 or like fastening devices and frictionally contacts with a similar sealing ring 47 that is secured by fastening devices 48 to an annular extension 49 of the metallic shell 40 of the receptacle 13. The sealing rings 45 and 47 preferably may be adjusted, as by providing slots therein through which the fastened devices 46 and 48 pass, so as to assure air-tight frictional contact between these rings at all times.

The portion of the inner layer 14 of the rotary compartment that is located inwardly of the extension 49 may be provided with an annular metallic casing member 50 which is connected by a metallic flange 51 with the adjacent end of the insulating layer 15 of the rotary compartment 10. An annular space 52 thus is provided between the insulating layer 15 of the rotary compartment 10 and the adjacent portion of the receptacle 13. A blow fan 53 may be arranged to discharge into the space 52 and the flange 51 is provided with apertures 54 in register with the passages 21 so that air from the fan 53 will pass into the compartment 52 and thence through the passages 21 longitudinally of the rotary compartment 10, thus providing for the cooling of the portions of the inner layer of the rotary compartment 10 which are out of contact with molten glass.

The head structure 11 comprises the refractory blocks 55, 56 and 57, the heat insulating layer 58, and the metallic shell 59. The head structure 11 is supported on the platform 34 by a suitable frame structure, as at 60, so as to be disposed in slightly spaced relation to the adjacent end of the walls of the rotary compartment 10 and so that portions of the refractory blocks 55 and 56 project into the space within the rotary compartment 10. An air-tight seal is provided between the outer layers of the head structure 11 and the rotary compartment 10 by the spring sealing rings 61 and 62, respectively, which frictionally contact with each other and are secured adjustably by the bolts 63 and 64, or like fastening devices, to the outer shells of the head structure 11 and the rotary compartment 10, respectively.

An annular space thus is produced at 65 between the head structure 11 and the adjacent end of the walls of the rotary compartment 10. This space 65 connects the adjacent ends of the passages 21 with the space within the rotary compartment 10.

The head structure 11 is formed with a feed opening 66 in the block 55. A substantially Y-shaped batch feeding casing 67 has a substantially horizontal tubular body connected with the block 55 for delivering glass batch to the passage 66 from an upwardly and outwardly inclined supply passage or hopper 68. The passage 68 may receive glass batch from any suitable source of supply, indicated by a tube 69. A helical screw feed conveyor 70 extends through the horizontal body of the feed casing 67 into the feed passage 66 and may be rotated by a shaft 71. The shaft 71 may be journaled in a closure 72 for the outer end of the horizontal body of the casing 67. Motion may be imparted to the shaft 71 by a worm wheel 73 in mesh with a worm 74 on a shaft 75. The shaft 75 may be supported in any suitable manner and may carry a pulley 76 connected by a belt 77 with a pulley 78 on a shaft 79. The shaft 79 may be rotatably supported by the frame structure 60 on the platform 34 and may carry a pulley 80 connected by a belt 81 with a pulley 82 on the aforesaid drive shaft 37.

The head structure 11 also is provided with an opening 83 formed through the block 56 above the feed opening 66 and enlarging toward its inner end. The lower wall of the opening 83 preferably is inclined downwardly and inwardly, as shown, so that flame from a burner 84 that discharges into the opening 83 will be directed downwardly and inwardly of the rotary compartment 10 at the inner end of the feed passage 66.

The platform 34 is supported pivotally adjacent one of its ends, as at 85, so that the platform and the structure thereon may be swung vertically about a horizontal axis extending transversely of the platform. The platform is adjustably supported adjacent to its opposite end in any suitable known manner, as by means of the structure indicated at 86 which includes vertical supporting screws 87 provided with disks having radial apertures for the insertion of hand levers 88 which can be manipulated to raise or lower the platform about the axial line of the pivot element 85. The axis of rotation of the rotary compartment 10 thus may be adjusted to lie in a horizontal plane or to be inclined slightly with respect to the horizontal so that the glass batch receiving end thereof will be slightly higher than the opposite or discharge end thereof.

The operation of the structure that has been described is substantially as follows:

Glass batch passes continuously from the source of supply, tube 69, through the passage 68 into feed casing 67 and is crowded by the action of the screw conveyor 70 along the feed casing 67 into and through the feed passage 66 of the head structure 11 so that a thin stream of glass batch is deposited continuously on the inner wall of the rotary compartment 10 at the inner end of the feed passage 66. The flame from the burner 84 heats the interior of the rotary compartment 10 and also plays on the glass batch as it is deposited in the compartment 10. The rotation of the compartment 10 not only brings a pre-heated wall of the compartment 10 underneath the deposited glass batch but assures heating of the deposited glass batch over a relatively wide area as such glass batch is rolled and kneaded in a mass in the bottom of the compartment 10. The heat from the burner thus is effectively applied to melt the glass batch and to refine the molten glass without excessive heating of the walls of the rotating compartment 10 as practically all portions of the glass batch deposited in the compartment 10 and of the resultant molten mixture are subjected to the action of heat from the burner and from the underlying wall of the rotary compartment as the contents of the rotating compartment are rolled and mixed by reason of the rotation of said compartment. The structure 86 is adjusted so that the molten mixture will move longitudinally of the rotating compartment 10 so that a pre-heated portion of the inner surface of the rotating compartment will be cleared sufficiently to receive the oncoming batch stream. The melting, mixing and refining of the glass contents of the compartment 10 thus will be accomplished continuously and uniformly. The discharge from the rotating compartment 10 into the working-out receptacle 13 preferably will be approximately equal to the inflow of the stream of glass making batch from the feed passage 66 into the rotating compartment.

If desired, the fan 53 may be operated to force cooling fluid through the passages 21 to cool the portions of the walls of the compartment 10 which are out of contact with the molten glass and such cooling fluid will be heated progressively while passing along the passages 21 so as to be heated sufficiently before passing from the space 65 into the interior of the rotating compartment to prevent any detrimental effect on the temperature condition within the rotating compartment 10. Such fluid may in fact be useful to support combustion from the burner 84 within the rotating compartment and in causing a desirable circulation of the heated currents within the rotating compartment from the burner end of the latter toward the outlet 44.

The molten glass passing from the rotating compartment 10 is received in the receptacle 13 and is removed from the latter through a work-out opening 43 in any suitable known manner, as by means of automatic machinery (not shown) or by hand operations, for fabrication into articles of glassware. The glass produced by the use of the novel method and the improved apparatus will be of uniform temperature and condition and will be free from the defects which so frequently are present in the glass that has been melted and refined in a large stationary furnace tank.

I claim:

1. The method of manufacturing glass for use in the fabrication of articles of glassware, comprising continuously depositing a stream of glass making batch on a continuously moving surface, subjecting the deposited portions of the batch stream to a heating action effective to promptly vitrify said batch near the point of entry of the batch, and moving said vitrified mixture continuously on said surface in a direction and at a rate effective to constantly clear a portion of said surface for the reception of the oncoming batch stream.

2. The method of making glass which comprises depositing a continuous stream of glass making batch on the inner surface of a continuously rotating cylindrical member, subjecting the deposited batch and the exposed portions of said inner surface of the cylindrical member to heat sufficient to promptly vitrify said batch, causing a continuous movement of the vitrified mixture longitudinally of the cylindrical member, and kneading and refining the mixture during such movement.

3. The method of making glass which comprises continuously feeding glass making batch into one end of a rotating cylindrical compartment of substantial length, introducing a heating medium into the same end of said compartment to promptly melt said glass batch and to heat the exposed portions of the inner wall of said compartment, causing the molten glass to move continuously longitudinally of said compartment while also kneading and refining it by the rotation of said compartment and the action of said heating medium, and discharging molten glass continuously from the second end of said rotating compartment.

4. The method of making glass which comprises continuously feeding glass making batch into one end of a rotating cylindrical compartment of substantial length, introducing a heating medium into the same end of said compartment to melt said glass batch near said end and to heat the exposed portions of the inner wall of said compartment, causing the molten glass to move continuously longitudinally of said compartment while also subjected to kneading caused by the rotation of said compartment, the adherence of the glass to the walls thereof, and the action of said heating medium therein, discharging molten glass continuously from the second end of said rotating compartment, and permitting escape of the products of combustion from the rotating compartment at the glass discharge end of the latter.

5. The method of making glass which comprises feeding glass making batch into one end of a rotating cylindrical compartment of substantial length, introducing a heating medium into the same end of said compartment to promptly melt said glass batch near said end and to heat the exposed portions of the inner wall of said compartment, causing the molten glass to move continuously longitudinally of said compartment while also subjected to mixing, kneading and refining influences caused by the rotation of said compartment, the adherence of the glass to the walls thereof, and the action of said heating medium therein, discharging molten glass continuously from the second end of said rotating compartment, and collecting the discharged glass for subsequent glass working-out operations.

6. The method of making glass which comprises feeding glass making batch into one end of a rotating cylindrical compartment of substantial length, introducing a heating medium into said compartment to rapidly melt said glass batch and to heat the exposed portions of the inner wall of said compartment, causing the molten glass to move continuously longitudinally of said compartment while also subjected to mixing, kneading and refining influences caused by the rotation of said compartment, the adherence of the glass to the walls thereof, and the action of said heating medium therein and discharging molten glass continuously from the second end of said rotating compartment.

7. Glass making apparatus comprising a substantially horizontal rotary cylindrical compartment, means for feeding glass making batch continuously in a stream into one end of said rotary compartment, means for projecting a heating medium into said one end of the rotary compartment, said heating medium being sufficient to reduce said batch to glass within the compartment, means for rotating said compartment continuously about its longitudinal axis, and means for receiving molten glass from the second end of the rotating compartment and for holding said molten glass for working-out operations.

8. Glass making apparatus comprising a substantially horizontal rotary cylindrical compartment, means for feeding glass making batch continuously in a stream into one end of said rotary compartment, means for projecting a heating medium into said one end of the rotary compartment, said heating medium being sufficient to reduce said batch to glass within the compartment, means for rotating said compartment continuously about its longitudinal axis, means producing an exhaust passage in communication with the second end of said rotating compartment to permit escape of products of combustion from the latter and means for receiving molten glass from the second end of the rotary compartment and for tempering the glass preparatory to its fabrication into glassware.

9. Glass making apparatus comprising an open ended hollow body having an inner layer of refractory material highly resistant to the corrosive action of molten glass, means for supporting said body with the longitudinal axis thereof substantially horizontal and for rotation about said longitudinal axis, means for rotating said hollow body about its longitudinal axis, a stationary head structure at one end of said hollow body, said head having a feed passage through which glass making batch may be fed into said hollow body and having also a burner opening through which a heating medium may be projected into said hollow body, said heating medium being sufficient to reduce said batch to glass within the compartment, a stationary receptacle at the second end of said rotary hollow body for receiving molten glass from said hollow body, and sealing means between the opposite ends of the walls of said rotary hollow body and the adjacent walls of said head structure and said stationary receptacle, respectively.

10. Glass making apparatus comprising an open ended hollow body having an inner layer of refractory material highly resistant to the corrosive action of molten glass, means for supporting said body with the longitudinal axis thereof substantially horizontal and for rotation about said longitudinal axis, means for rotating said hollow body about its longitudinal axis, a stationary head structure at one end of said hollow body, said head having a feed passage through which glass making batch may be fed into said hollow body and having also a burner opening through which a heating medium may be projected into said hollow body for melting said batch, a stationary receptacle at the second end of said rotary hollow body for receiving molten glass from said hollow body, sealing means between the opposite ends of the walls of said rotary hollow body and the adjacent walls of said head structure and said stationary receptacle, respectively, and means for adjusting said supporting means for the hollow body to adjust the axis of rotation of the hollow body in respect to the horizontal.

11. Glass making apparatus comprising a substantially cylindrical open ended body having a refractory inner layer highly resistant to the corrosive action of molten glass, a heat insulating layer surrounding said inner layer and a sectional metallic shell outside of said insulating layer, means supporting said body so that the longitudinal axis thereof will be substantially horizontal and so that said body may be rotated about its longitudinal axis, a stationary receptacle overlapping an end portion of the rotary body for receiving molten glass from said rotary body, said stationary receptacle having an outlet for the escape of gaseous products of combustion, flexible sealing means between the walls of the rotary body and the adjacent walls of said stationary receptacle, and means at the opposite end of said rotary body for feeding glass batch thereinto and for projecting a heating medium to position to melt the glass batch in said hollow body.

12. Glass making apparatus comprising a substantially horizontal substantially cylindrical furnace body, means for rotating said furnace body continuously about its longitudinal axis, means for feeding glass batch continuously in a stream into one end of said furnace body, means for projecting a heating medium into said furnace body adjacent to the glass batch therein, said heating medium being sufficient to reduce said batch to glass within the compartment, and a stationary receptacle overlapping the opposite end of said rotating furnace body for receiving a continuous discharge of molten glass from the latter, said stationary receptacle having a glass work-out opening in its walls.

13. Glass making apparatus comprising a substantially horizontal substantially cylindrical furnace body, means for rotating said furnace body continuously about its longitudinal axis, means for feeding glass batch continuously in a stream into one end of said furnace body, means for projecting a heating medium into said furnace body adjacent to the glass batch therein, and heating medium being sufficient to reduce said batch to glass within said furnace body, and a stationary receptacle overlapping the opposite end of said rotating furnace body for receiving a continuous discharge of molten glass from the latter, said stationary receptacle having a glass work-out opening in its walls, and having a section of its walls next to said rotary furnace body removable to permit removal and replacement of said furnace body.

14. Glass making apparatus comprising a platform, a substantially cylindrical furnace body supported on its side on said platform for rotation about its longitudinal axis, and having a lining of refractory material to which glass adheres, a head structure fixed on said platform at one end of said rotary body, said head structure having means for feeding a stream of glass batch continuously into one end of said rotary furnace body and for projecting a heating medium into said furnace body to melt the batch therein, a glass working-out receptacle carried by said platform in position to receive molten glass from the second end of said furnace body, means for rotating said furnace body continuously about its longitudinal axis, and means for supporting said platform for adjustment vertically about a horizontal axis extending transverse to the longitudinal axis of said furnace body, whereby the axis of rotation of the furnace body may be adjusted in respect to the horizontal.

15. In glass making apparatus, a substantially cylindrical furnace body supported with its longitudinal axis substantially horizontal and for rotation about its longitudinal axis, said furnace body having circumferentially spaced longitudinal passages in its walls, said longitudinal passages being located between the outer and inner peripheral surfaces of said furnace body, means communicating with said passages at one end of said furnace body for supplying cooling fluid thereto, stationary structures at opposite ends of said rotary furnace body and spaced slightly therefrom to permit communication between the opposite ends of said longitudinal passages and the interior of the furnace body, one of said stationary structures having means for feeding glass batch continuously into said furnace body and for introducing a heating medium into the furnace body to melt said batch, the other stationary structure having a compartment for the reception of molten glass from said furnace body, and flexible sealing means between the opposite ends of the walls of said furnace body and adjacent portions of said stationary structures, said sealing means being located outwardly of said longitudinal passages in the walls of said furnace body.

16. The method of making glass comprising continuously feeding glass batch into one end of a rotary container, melting the batch therein and kneading the melted glass within the container by rotating the container about a substantially horizontal axis and continuously delivering molten glass from the other end of the container.

17. The method of making glass comprising continuously feeding glass making batch into a rotary container having a substantially horizontal axis, applying heat within the container to melt the batch, rotating the container to mix and refine the molten glass, and continuously discharging the melted glass from the container.

18. Glass making apparatus comprising a rotary container having a substantially horizontal axis, means for continuously feeding batch into said container, means for rotating the said container about its axis, means for melting the batch within the container, a stationary container arranged to continuously receive the molten glass from the rotary container, and means for further conditioning melted glass within the stationary container.

19. The method of making glass, comprising feeding glass batch into one end of a continuously rotating container, melting the batch therein, and kneading the melted glass within the container by continuously rotating the container about a substantially horizontal axis, and continuously delivering molten glass from the other end of the container.

20. Apparatus for the continuous making of glass comprising a rotary melting chamber, stationary batch feeding and heating passages associated therewith, a stationary refining chamber, means for continuously delivering glass batch to the rotary chamber, means for melting batch into glass in the chamber, and means for continuously delivering melted glass from the rotary chamber to the refining chamber.

Signed at Hartford, Conn., this 26th day of September, 1927.

WALTER O. AMSLER.